March 15, 1949.　　　A. G. PETERSON　　　2,464,715

DEPTH SOUNDER

Filed March 24, 1947

Inventor
Arthur G. Peterson
By his Attorneys
Merchant & Merchant

Patented Mar. 15, 1949

2,464,715

UNITED STATES PATENT OFFICE 2,464,715

DEPTH SOUNDER

Arthur G. Peterson, St. Paul, Minn.

Application March 24, 1947, Serial No. 736,675

6 Claims. (Cl. 33—126.5)

My invention relates to depth sounding devices, particularily of the type used by fishermen.

An important object of my invention is the provision of a depth sounder, which can be readily and safely secured to a fish hook and line, thereby obviating the necessity of a separate line for this purpose.

Another important object of my invention is the provision of a depth sounder which is extremely inexpensive to manufacture and compact and rugged in construction.

The above and still further objects of my invention will become apparent from the following detailed specification, appended claims, and attached drawings.

Referring to the drawings, wherein like characters indicate like parts throughout the several views.

Figure 1:
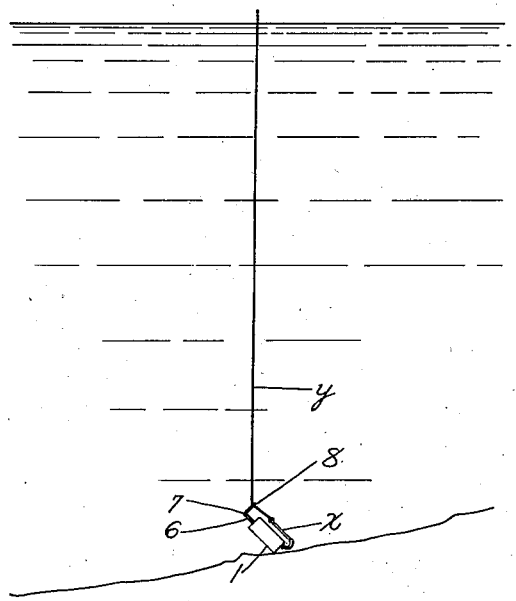
Fig. 1 is a side elevation showing my novel depth sounder attached to a fish line and illustrating its use in the water.

Referring with greater particularity to the drawings, the numeral 1 indicates a nonbuoyant body element, preferably and as shown, in the form of an elongated cylinder having a downwardly-opening axial bore or recess 2 in the bottom end thereof. Body 1 is preferably cast from lead or other heavy metal. A cork 3 or other yieldingly compressible material is inserted into the bore 2 in a manner, so as to frictionally retain itself therein.

Extending upwardly from the upward end 4 of body 1 are a pair of spaced legs 5 and 6 respectively, which are bent at right angles, as indicated at 7, and terminate in a looped end at 8, which is laterally offset from the adjacent side edge of the cylindric body 1. Legs 5 and 6 are preferably imbedded into the metal of body 1 and are preferably formed from a single piece of resilient wire in the form of a hairpin. Also preferably and as shown, legs 5 and 6 are formed to converge toward each other to approximately abutting relationship, as indicated at 9, so as to define a normally closed line-receiving aperture 10 and an elongated hook-receiving aperture 11.

Figure 2:
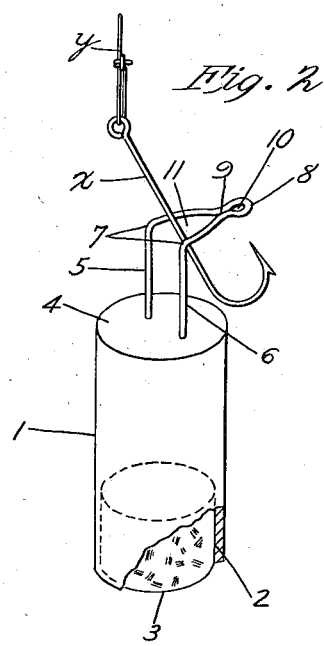
Fig. 2 is an enlarged perspective view, with some parts broken away, illustrating the manner of inserting a fish hook through the hook-receiving aperture formed by the resilient legs.
Figure 3:
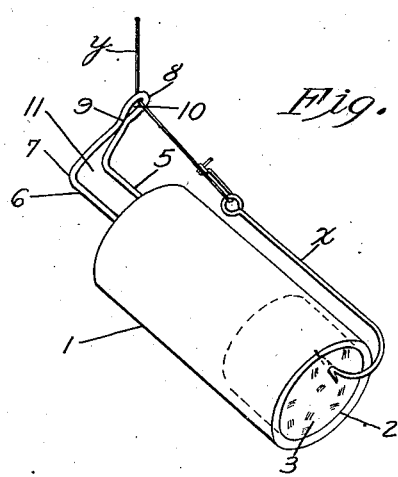
Fig. 3 is a further enlarged perspective view showing the fish hook and line in their proper weight supporting positions.

Fig. 2 illustrates the method of inserting a fish hook, indicated by the letter $x$ into the elongated hook-receiving aperture 11 formed by the resilient legs 5 and 6. Thereafter, the pointed end of the hook $x$ is forced into the cork 3 or other yieldingly compressible material in the bore 2. The line $y$ is then forced into the normally-closed line-receiving aperture 10 by spreading slightly the abutting portions 9 of the resilient legs 5 and 6. It will be obvious from the above that even should the pointed end of hook $x$ be disengaged from the cork 3, the weight will not become disengaged from the hook $x$ as the size of the normally-closed line-receiving aperture 10 is not such to permit passage therethrough of the hook $x$.

While I have described a commercial adaptation of my invention, it should be obvious that the same is capable of modification without departure from the scope of the appended claims.

What I claim is:

1. A depth sounding weight comprising a nonbuoyant body element, a pair of spaced resilient legs secured to the upper end portion of the body and extending upwardly therefrom and terminating in a looped portion laterally outwardly therefrom, said body member being provided with a recess below the top thereof to receive the upturned end of a hook.

2. The structure defined in claim 1 in which the hook-receiving recess is in the nature of an axially-extending opening in the base of said body.

3. The structure defined in claim 1 in which said resilient legs converge adjacent the looped end portion to provide a spring clip.

4. In a structure of the class described, a cylindrical metallic body, a downwardly-opening axial bore in the bottom of said body, yieldingly compressible material in said bore, and a pair of spaced resilient legs projecting upwardly and outwardly from the upper end of said body and terminating in a looped portion laterally offset from the side thereof.

5. The structure defined in claim 4 in which said spaced resilient legs converge adjacent the looped portion to provide a normally closed aperture.

6. The structure defined in claim 4 in which said resilient legs converge intermediate their end portions to provide a normally closed line-receiving aperture and an elongated hook-receiving aperture.

ARTHUR G. PETERSON.

No references cited.